United States Patent [19]
Neumann et al.

[11] Patent Number: 5,826,887
[45] Date of Patent: Oct. 27, 1998

[54] SEALING DEVICE

[75] Inventors: Wieland Neumann, Mönchengladbach; Helmut Mehl, Weilburg, both of Germany; Bent Holmen, Bröndeslev, Denmark; Ulf Nilsson, Värnamo, Sweden; Elvir Cavka, Värnamo, Sweden; Sören Forsberg, Värnamo, Sweden; Kennet Ekholm, Forsheda, Sweden; Mika Leppimäki, Bor, Sweden; Joakim Andersson, Anderstorp, Sweden

[73] Assignee: Forsheda AB, Forsheda, Sweden

[21] Appl. No.: 757,381

[22] Filed: Nov. 27, 1996

[30] Foreign Application Priority Data

Dec. 27, 1995 [SE] Sweden ................... 9504699

[51] Int. Cl.⁶ .................................. F16L 17/10
[52] U.S. Cl. ........................... 277/605; 277/609
[58] Field of Search ..................... 277/605, 608, 277/609; 285/230, 231

[56] References Cited

U.S. PATENT DOCUMENTS

| | | | |
|---|---|---|---|
| 1,969,789 | 8/1934 | Finken | 277/207 A |
| 2,924,472 | 2/1960 | Bush | 277/207 A |
| 3,432,175 | 3/1969 | Kawai | 277/207 A |
| 3,821,340 | 6/1974 | Marks | 277/207 A |
| 4,216,981 | 8/1980 | Jensen | 285/231 |
| 4,993,722 | 2/1991 | Gundy | 277/207 A |
| 5,417,442 | 5/1995 | Jorhagen | 277/207 A |
| 5,507,504 | 4/1996 | Neumann et al. | 277/207 A |
| 5,580,068 | 12/1996 | Gundy | 277/207 A |
| 5,599,028 | 2/1997 | Neumann et al. | 277/207 A |

FOREIGN PATENT DOCUMENTS

| | | | |
|---|---|---|---|
| 941618 | 1/1949 | France | 285/231 |
| 3414180 | 10/1985 | Germany | 277/207 A |
| 258591 | 9/1992 | Japan | 285/231 |
| 174157 | 6/1994 | Japan | 285/231 |
| 149440 | 1/1984 | Norway . | |
| 408565 | 9/1966 | Switzerland . | |
| 420077 | 11/1934 | United Kingdom | 285/231 |
| 961768 | 6/1964 | United Kingdom | 277/207 A |

*Primary Examiner*—Randolph A. Reese
*Assistant Examiner*—John L. Beres
*Attorney, Agent, or Firm*—Baker & Daniels

[57] ABSTRACT

A sealing device for sealing a space established by connecting two sealing surfaces (42*b*, 52*b*) positioned on one element each of two elements (44*b*, 48*b*), for example two concrete pipes, to a position in which the sealing surfaces face each other comprises a sealing body (80) consisting of elastic material. The sealing body (80) is adapted at the connection of the sealing surfaces (42*b*, 52*b*) to take a position in the space in which it engages the sealing surfaces. The sealing device comprises an activating device (82–90) for forcing the sealing body (80) positioned in the space against the sealing surfaces (42*b*, 52*b*) when the activating device is activated. (FIG. 6*a*)

13 Claims, 9 Drawing Sheets

SEALING DEVICE

BACKGROUND OF THE INVENTION

The present invention relates to a sealing device for sealing a space which is established by connecting two sealing surfaces positioned on one element each of two elements, for example two concrete pipes.

It is previously known to seal a space formed by two opposite sealing surfaces on for example two concrete pipes by means of a sealing body consisting of elastic material. When the sealing surfaces are introduced one into the other to the position for establishing the space, the sealing body will take a position contacting the sealing surfaces in the space for closing and sealing the space. The sealing device of the kind described can be used for example in connection with concrete pipes of the type provided with a socket and a spigot end, the sealing surfaces being provided at a substantially cylindrical, inner surface of the socket and a substantially cylindrical, outer surface of the spigot end. The space between the sealing surfaces is established by introducing the pipes one into the other in the axial direction and in a substantially concentric position in relation to each other, whereby the sealing body which has previously been positioned either at the sealing surface of the socket or at the sealing surface of the spigot end will take the position in the space, in which it contacts the sealing surface. In order to make sure that the space is sealed in a correct way, it is necessary that the sealing body subsequently to the completing of the joint comprising the sealing surfaces and the sealing body contacts the sealing surfaces with sufficient sealing force. Sufficient sealing force is provided by the fact that the sealing body is in a predetermined degree compressed in the space because of the fact that the sealing body has in a direction transversely of the sealing surfaces prior to the positioning of the sealing ring in the space larger dimensions than the space.

If the compression of the sealing body in the space is provided as a consequence of the introduction of the sealing surfaces one into the other there are contradictory wishes with regard to the magnitude of the compression. Thus, it is desirable that the compression shall be large so as to secure the tightness of the joint, while it is desirable that the compression shall be small so as to make sure that the jointing force necessary for introducing the sealing surfaces one into the other shall not be of such a magnitude that there will be problems in providing the pipe jointing. In a sealing device for concrete pipes this problem is accentuated as the deviations of the dimensions of the concrete pipes from nominal values are often relatively large which provides that the dimensions of the space can vary in one and the same pipe joint as well as between different pipe joints within relatively wide limits. This means that the compression will be substantial in a space having minimum dimensions as the sealing body has to be dimensioned so that the compression is of sufficient size for securing the tightness of the joint also in a space having maximum dimensions.

SUMMARY OF THE INVENTION

The object of the invention is to provide a sealing device for sealing a space, especially in a joint between concrete pipes, in which the difficulties described above with regard to the contradictory wishes for high compression in order to secure the tightness of the joint and low compression in order to facilitate the pipe jointing are satisfied.

In order to comply with this object the sealing device according to the invention is characterized by an activating device for forcing the sealing body positioned in the space against the sealing surfaces when it is activated.

Thus, in the sealing device according to the invention the sealing body can be dimensioned so that the jointing force when introducing the sealing surfaces one into the other is low because of the fact that the dimensions of the sealing body transversely of the sealing surfaces exceed the dimensions of the space only in moderate degree and the fact that the sealing body is subsequently to the establishment of the space forced against the sealing surfaces by means of the activating device so that the tightness of the joint is secured also in such cases where the dimensions of the space in a substantial degree deviate from the nominal value.

In accordance with the invention the activating device of the sealing device can be constituted by an expansion device. Thereby, the expansion device can be adapted at the activation of the activating device to expand a cavity positioned in the sealing body in a direction transversely to the sealing surfaces in order to force the sealing body against the sealing surfaces. Alternatively the expansion device can be adapted at the activation of the activating device to compress at least parts of the sealing device in a direction substantially parallel with the sealing surfaces in order thereby to force the sealing body against the sealing surfaces.

In the first mentioned case the expansion device can include an expansion element can be forced into the cavity of the sealing body and having a wedge-shaped cross section, or the expansion device can comprise a device for forcing into the cavity of the sealing body a pressure medium for expanding the cavity in a direction transversely of the sealing surfaces for forcing the sealing body against the sealing surfaces.

In a sealing device in which the activating device is adapted to compress parts of the sealing body in a direction substantially parallel with the sealing surfaces, the sealing body is preferably positioned between the expansion device and a support surface extending transversely of the sealing surfaces, the expansion device thereby comprising either an expansion body provided with an inner cavity which is expandable by supplying a pressure medium to the cavity of the expansion body or can be constituted by a pressure body forcable against the sealing body in a direction substantially parallel with the sealing surfaces.

In a preferred embodiment of the invention the activation device of the sealing device is adapted to be activated as a consequence of the introduction of the sealing surfaces one into the other. Thereby, the activating device is adapted to be activated by the engagement with at least one surface on one of the two elements, for example the concrete pipes. In the case that the sealing surfaces are adapted to be introduced one into the other in a direction parallel with the sealing surfaces the activating device is suitably adapted to be activated by engagement with at least one surface extending transversely of the sealing surfaces. In such embodiments of the sealing device according to the invention which comprise the above mentioned wedge-shaped expansion element or the pressure body forcable against the sealing body, as mentioned above, the wedge-shaped expansion element and the pressure body can be forced into the cavity of the sealing body and forced against the sealing body, respectively, by a surface on one of the elements, extending transversely of the sealing surfaces when the sealing surfaces are introduced one into the other by displacing the elements, for example the concrete pipes, towards each other to the position for providing the joint.

In the case that the sealing device comprises an expansion device of the kind which is intended to force a pressure medium into a cavity in the sealing body or into an expansion body, the activating device can be activated by compressing an element containing the pressure medium between two surfaces extending transversely of the sealing surfaces and which are displaced towards each other when the sealing surfaces are introduced one into the other.

In the sealing device according to the invention the requirement for a low jointing force as well as the requirement for a high sealing force against the sealing surfaces are satisfied at the same time as it is in the preferred embodiments of the sealing device according to the invention possible in an automatic way to activate the activating device of the sealing device by means of the movement necessary for establishing the joint.

A number of different embodiments of the sealing device according to the invention shall be described in the following with reference to the accompanying drawings.

BRIEF DESCRIPTION OF THE DRAWINGS

FIGS. 6a and 6b show sections of a further embodiment of a sealing device according to the invention for sealing a pipe joint, in which FIG. 6a shows the sealing device prior to the establishment of the pipe joint and FIG. 6b shows the sealing device subsequently to the establishment of the pipe joint with an activating device included in the sealing device being shown in an activated position.

DETAILED DESCRIPTION OF THE INVENTION

Figure 1A:
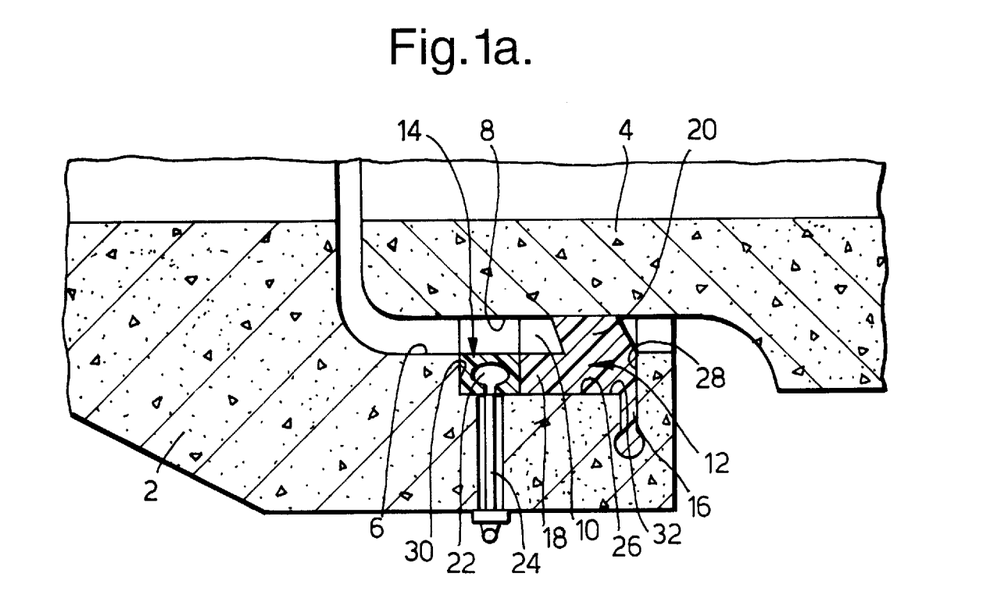
FIGS. 1a and 1b show a sealing device according to the invention having a sealing body moulded into a pipe socket prior to respectively subsequently to the activation of an activating device included in the sealing device.
Figure 1B:
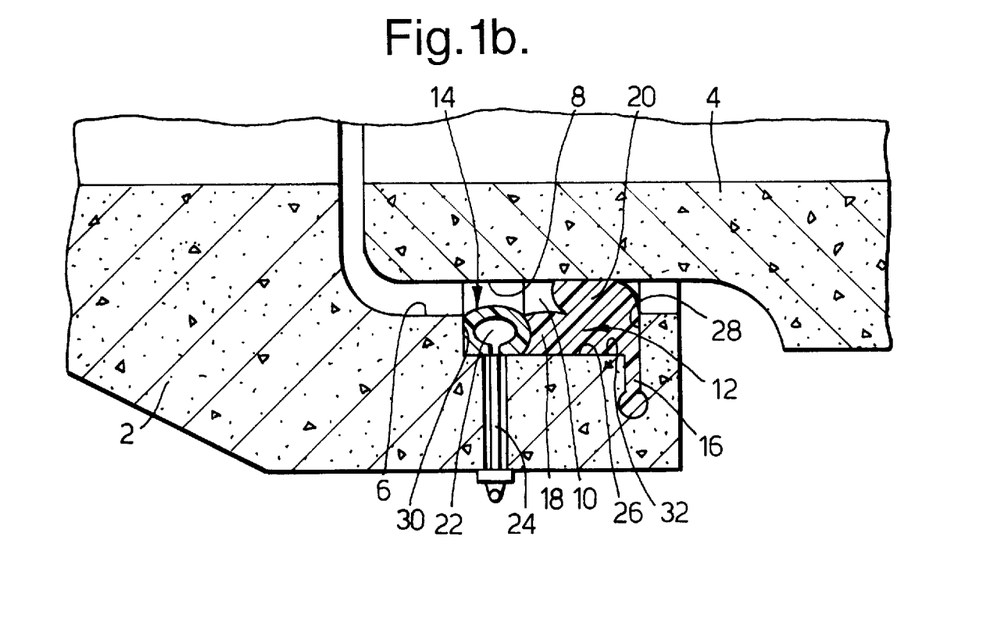

In FIGS. 1a and 1b there is shown a pipe joint between two concrete pipes, one forming a socket 2 and the other forming a spigot end 4. In the figures there is shown only sections of the walls of the pipes, while it is recognized that the pipes are in a conventional way of substantially cylindrical shape. The socket 2 has a sealing surface 6, and the spigot end 4 has a sealing surface 8, both being of substantially cylindrical shape and together defining a space 10. The space 10 is established by displacing the sealing surfaces 6 and 8 together in an axial direction which is provided by displacing the pipes one into the other in a substantially concentric position. Thereby, the pipes can be positioned either in a horizontal position or in a vertical position, the pipes being in the last mentioned case constituted by well rings for forming a manhole.

Between the socket 2 and the spigot end 4 there is positioned a sealing device for sealing the space 10, and this sealing device is in addition to the sealing surfaces 6 and 8 constituted by an elastic material sealing ring 12 and an activating device 14. The sealing ring 12 and the activating device 14 are moulded into the socket 2, and the sealing ring 12 has a fastening portion 16 which secures the connection of the sealing ring with the socket. In addition thereto the sealing ring 12 has a retainer portion 18 and a sealing body 20.

The activating device 14 is constituted by an annular portion having an annular cavity 22 to which there is connected a pressure line 24 extending through the material of the socket to the outer surface of the socket. The activating device 14 and the retainer portion 18 of the sealing ring 12 are arranged in a groove 26 formed in the sealing surface 6 of the socket, the groove forming support surfaces 28 and 30 extending transversely in relation to the sealing surfaces 6 and 8 and forming also a bottom surface 32. The sealing body 28 of the sealing ring 12 is dimensioned in relation to the space 10, i.e. the distance between the sealing surface 8 and the part of the sealing surface 6 formed by the bottom surface 32 of the groove 26, so that the sealing body 20 is at the introduction of the sealing surfaces one into the other to the position shown in FIG. 1a subjected to a slight compression in the direction transversely of the sealing surfaces. This slight compression provides that the introduction of the sealing surfaces one into the other, i.e. the mounting of the pipe joint, can take place without problems and by means of a small jointing force.

After the pipe joint has been established taking the position shown in FIG. 1a there is required an increased compression of the sealing body 20 of the sealing ring 12 for efficiently and securely closing the space between the socket and the spigot end of the pipes in the pipe joint. This is provided by activating the activating device 14 which through the pressure line 24 is supplied with a pressure medium expanding the cavity 22 and forcing the retainer portion 18 of the sealing ring against the support surface 28. This compression of the retainer portion 18 in an axial direction provides for a force acting for expanding the sealing body 20 in a radial direction, in turn providing that the sealing body is with an increased sealing force pressed against the sealing surface 8 and the part of the sealing surface 6, forming the bottom surface 32 of the groove. The pressure medium supplied to the cavity 22 through the pressure line 24 can for example be constituted by some kind of siliconepaste, any material which hardens after being supplied to the cavity, or a completely liquid medium such as a mixture of glycol and water. The supply of pressure medium to the cavity 22 takes place until the desired sealing force has been established with regard to the tightness of the joint and the strength of the socket and the spigot end.

Figure 2A:
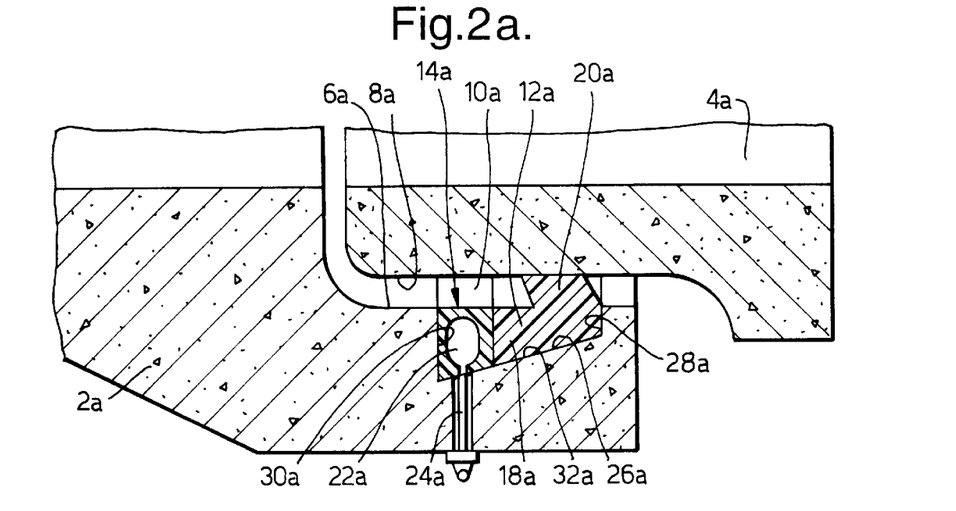
FIGS. 2a and 2b show a modified embodiment of a sealing device provided with a sealing body moulded into a pipe socket, the activating device being shown prior to and subsequently to activation, respectively.
Figure 2B:
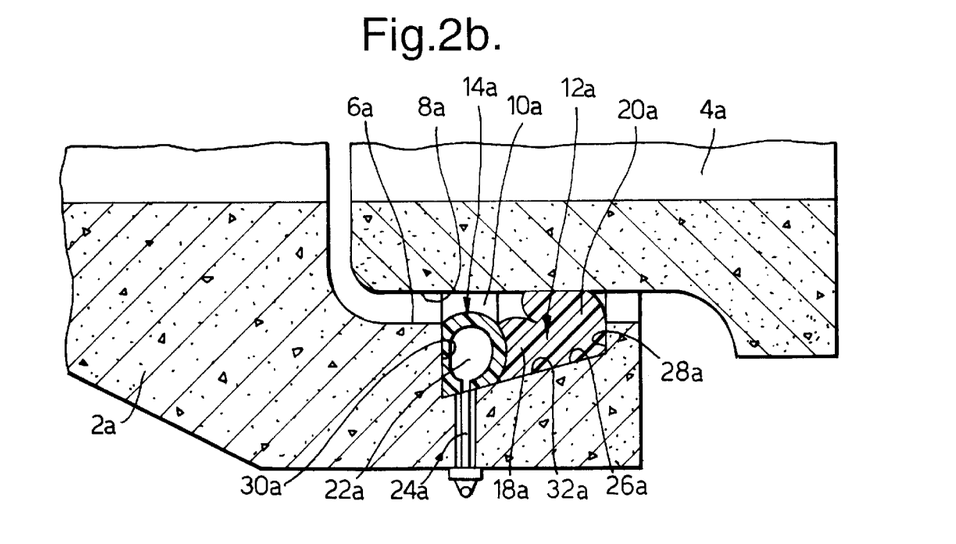

In FIGS. 2a and 2b there are shown sections of a sealing device according to the invention which in all essential respects correspond with the sealing device shown in FIGS. 1a and 1b. Corresponding portions of the embodiment according to FIGS. 2a and 2b are designated with the same reference numerals as according to FIGS. 1a and 1b with the addition "a". In the embodiment according to FIGS. 2a and 2b the sealing ring 12a lacks the fastening portion 16, and the groove 26a of the sealing surface 6a on the socket 2a is inclined in such a way that the space 10a tapers in the direction of the support surface 28a in the area of the groove 26a. Thereby, there is at the activation of the activating device 14a obtained an increased sealing force with regard to the pressure of the sealing body 20a against the sealing surfaces by the fact that the sealing ring 12a is at the activation of the activating device 14a forced against a more narrow part of the space 10a.

Figure 3A:
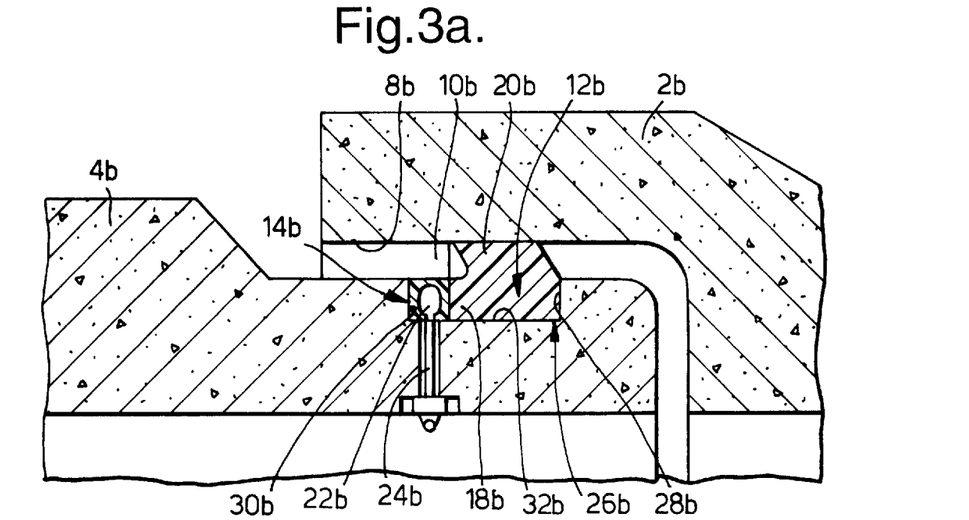
FIGS. 3a and 3b show sections of a sealing device according to the invention, the sealing body of the sealing device being moulded into a spigot end and showing the activating device of the sealing device prior to and subsequently to activation, respectively.
Figure 3B:
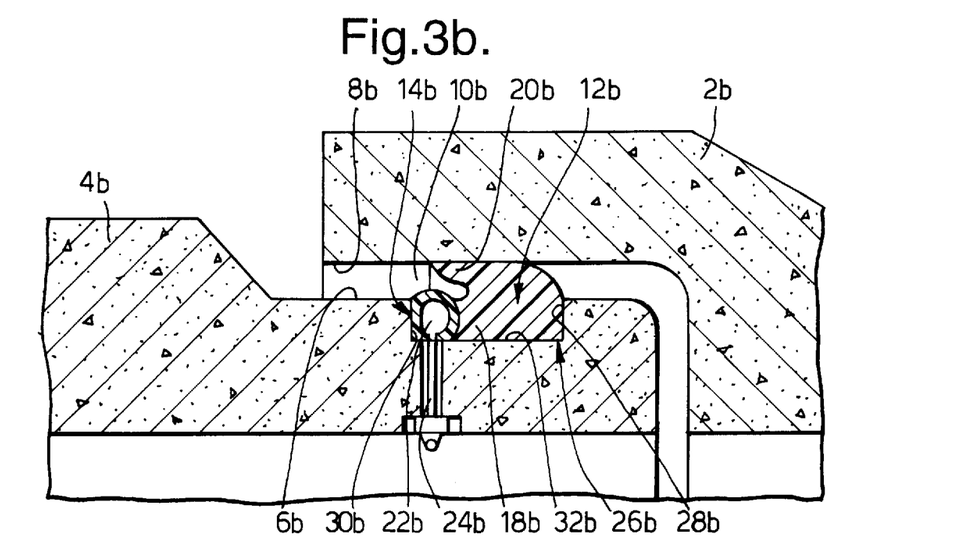

The embodiment of the sealing device according to FIGS. 3a and 3b is in all essential respects corresponding to the embodiment according to FIGS. 1a and 1b, and corresponding parts in FIGS. 3a and 3b are provided with the same reference numerals as according to FIGS. 1a and 1b with the addition "b". In the embodiment according to FIGS. 3a and 3b the sealing ring 12b and the activating device 14b are positioned in a groove 26b in the spigot end 4b instead of in the socket. Thereby, the pressure line 24b is accessible from the inner side of the pipe which especially in manholes can facilitate the supply of pressure medium to the activating device 14b and also makes it possible afterwards to supply pressure medium, if the joint should appear to be untight.

Figure 4A:
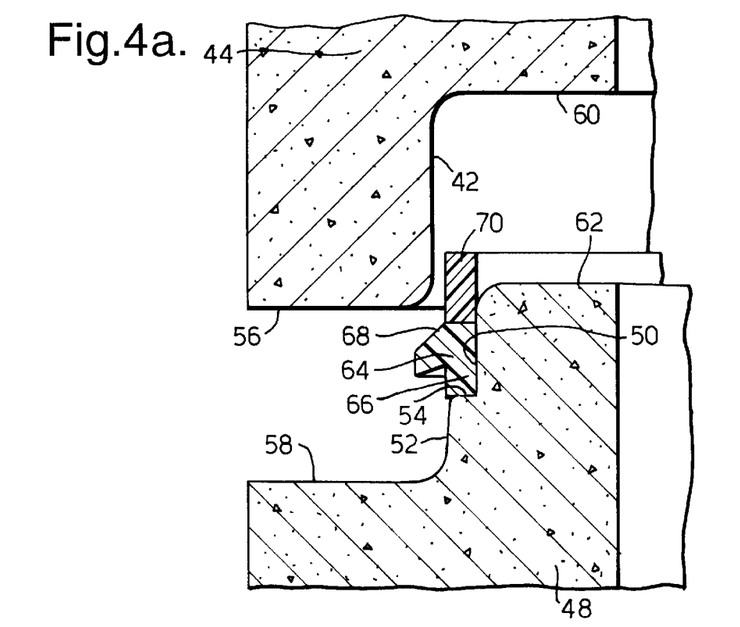
FIGS. 4a and 4b show sections of an embodiment of a sealing device according to the invention in a pipe joint prior to and subsequently to the establishment of the pipe joint and activation of an activating device included in the sealing device, respectively.
Figure 4B:
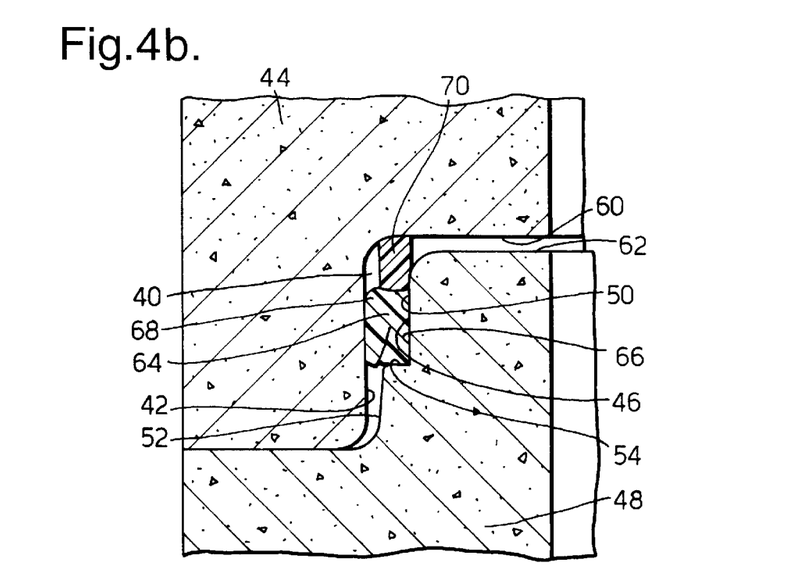

The embodiment of a sealing device according to the invention shown in section in FIGS. 4a and 4b is intended for sealing a space 40 between a sealing surface 42 at the inner side of a socket 44 and a sealing surface 46 at the outer surface of a spigot end 48. The sealing surface 46 forms a portion 50 having a smaller diameter and a portion 52 having a larger diameter which are connected with each other by means of a shoulder 54 extending transversely of the sealing surfaces 42 and 46. In addition thereto the socket 44 and the spigot end 48 form surfaces 56 and 58 as well as 60 and 62, respectively, facing each other, which surfaces extend in the transverse direction of the sealing surfaces 42 and 46.

A sealing 64 having a retainer portion 66 and a sealing body 68 rests with its retainer portion 66 on the shoulder 54. The sealing ring 64 consists of rubber-elastic material. At its upper part the sealing ring 64 supports an annular activating device 70 of elastic but harder material than the sealing ring 64.

When the socket 44 is jointed with the spigot end 48 by connecting the two pipes on which the spigot end and the socket are provided with each other for establishing the sealing space 40, the sealing body 68 of the sealing ring 64 will initially be compressed in a relatively restricted degree. This provides that the jointing force necessary for the pipe jointing is relatively small. When the space 48 has been established and the surfaces 56 and 58 and the surfaces 60 and 62, respectively, have been displaced towards each other, the surface 60 will engage the annular activating device 70 which thereby subjects the sealing ring to an axially directed compression which is increased until the surfaces 56 and 58 have been displaced to engagement with each other and the final position of the joint has been reached. Because of the axial compression of the sealing ring 64 as a consequence of the activation of the activating device 70 the sealing body 68 of the sealing ring 64 will as a consequence of an increasing sealing force be forced against the sealing surface 42 of the socket 44 and the sealing surface 46 of the spigot end 48. Thus, there is in this embodiment provided an automatic activation of the activating device 70 by the influence of the weight of the pipe provided with the socket 44.

Figure 5A:
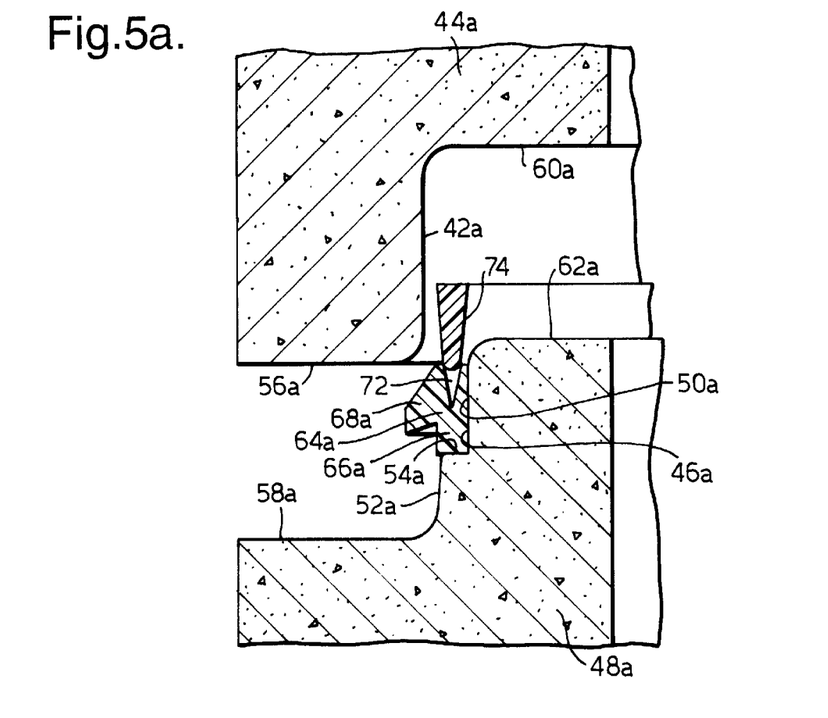
FIGS. 5a and 5b show sections of a further embodiment of a sealing device according to the invention to be used in a pipe joint prior to the establishment of the pipe joint and subsequently to the establishment of the pipe joint with an activating device included in the sealing device being shown in an activated position, respectively.
Figure 5B:
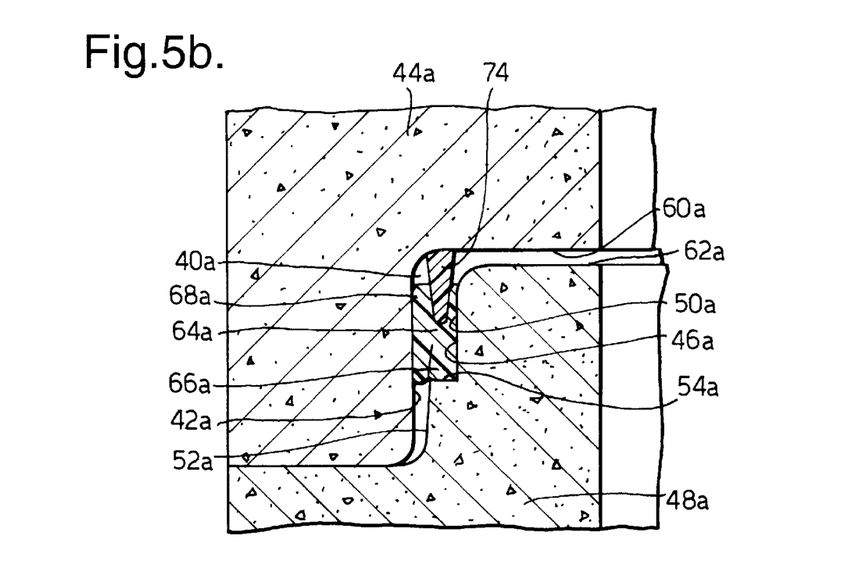

In the embodiment according to FIGS. 5a and 5b the sealing device according to the invention is used for sealing a space 40a between a sealing surface 42a on a socket 44a and a sealing surface 46a on a spigot end 48a. As in the embodiment according to FIGS. 4a and 4b, the sealing surface 46a of the spigot end 48a is provided with two portions 50a and 52a of different diameters and a shoulder 54a. As in the embodiment according to FIGS. 4a and 4b, the socket 44a and the spigot end 48a have in the embodiment according to FIGS. 5a and 5b surfaces 56a and 58a and surfaces 60a and 62a, respectively, facing each other and extending transversely in relation to the sealing surfaces.

As the sealing ring in the embodiment according to FIGS. 4a and 4b the sealing ring 64a included in the sealing device according to FIGS. 5a and 5b has a retainer portion 66a resting on the shoulder surface 54a and a sealing body 68a. At its upper portion the sealing body 68a has a V-shaped groove 72 in which the activating device of the sealing device engages, the activating device having the form of an annular wedge 74.

When the spigot end 48a is introduced into the socket 44a the space 40a is established at a certain compression of the sealing body 68a of the sealing ring 64a. The relatively moderate compression provides that the jointing force is small and that the introduction of the spigot end 48a into the socket 44a for establishing the space 40a can take place without any problems. When the surface 60a of the socket 44a contacts the upper surface of the wedge-shaped activating device 74 this is forced into the groove 72 which provides for an increased pressing of the sealing body 68a against the sealing surface 42a of the socket 44a and the sealing surface 46a of the spigot end 48a. The wedge-shaped activating device 74 endeavors to provide a combined effect by radial expansion of the sealing body 68a and axial compression of the sealing ring 64a, which compression in turn provides for a further increased sealing force in the radial direction.

Figure 6A:
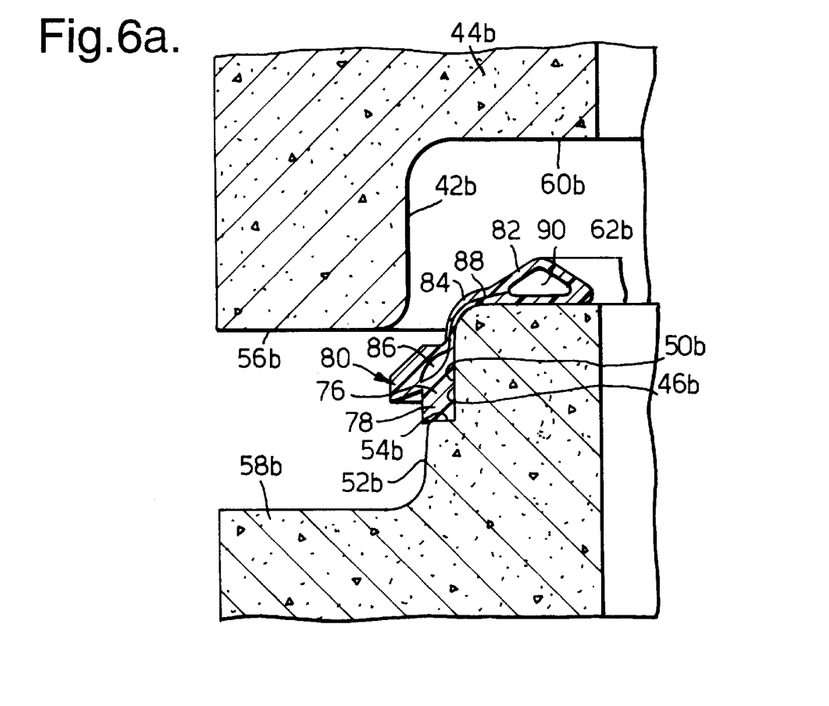
Figure 6B:
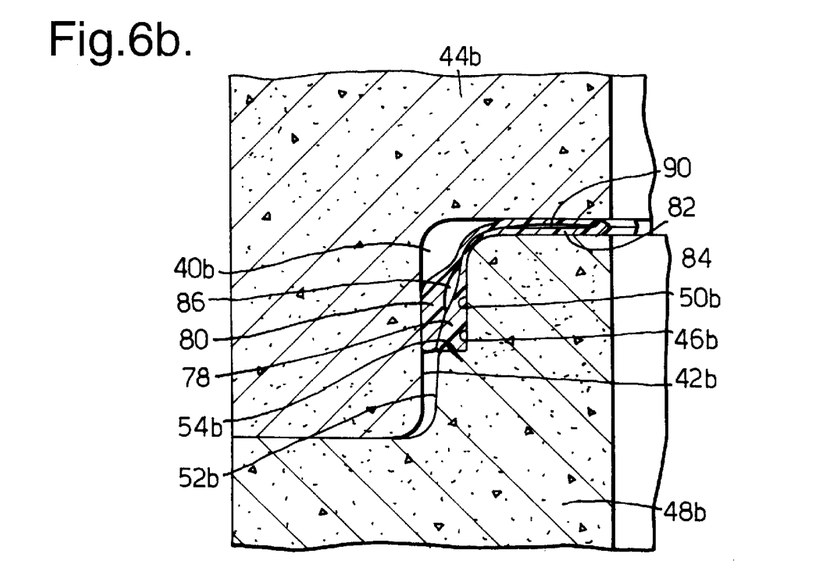

The embodiment of the sealing device according to the invention shown in FIGS. 6a and 6b is intended for sealing a space 40b between a socket 44b and a spigot end 48b of the same design as according to FIGS. 4a and 4b and FIGS. 5a and 5b. The surfaces of the socket and the spigot end are provided with the same reference numerals as according to FIGS. 4a and 4b and FIGS. 5a and 5b, respectively, with the addition of "b". The sealing device according to FIGS. 6a and 6b comprises a sealing ring 76 having a retainer portion 78 and a sealing body 80. In addition thereto, the sealing device comprises an activating device 82 which is connected with the sealing body 80 by means of a connection portion 84. The activating device 82 rests on the surface 62b of the spigot end 48b. The sealing body 80 is formed with a peripherally extending cavity 86 which through a channel 88 formed in the connection portion 84 is connected with a cavity 90 formed in the activating device 82. The cavities 86 and 90 contains a pressure medium which for example can be constituted by silicone paste, any curable material or a liquid, for example a mixture of glycol and water. When the socket 44b is lowered towards the spigot end 48b for establishing the space 40b between the sealing surfaces 42b and 46b, the sealing body 80 is initially subjected to a moderate compression which facilitates the jointing movement as a consequence of a small jointing force. When the surface 60b of the socket 44b arrives into engagement with the activating device 82, the cavity 90 is compressed and the pressure medium therein is through the channel 88 forced into the cavity 86 in the sealing body 80. Thereby, the sealing body 80 will obtain a increased sealing force against the sealing surfaces 42b and 46b. Thus, also in the embodiment according to FIGS. 6a and 6b there is provided an automatic activation of the activating device for providing an increased sealing pressure against the sealing surfaces in the space.

Figure 7A:
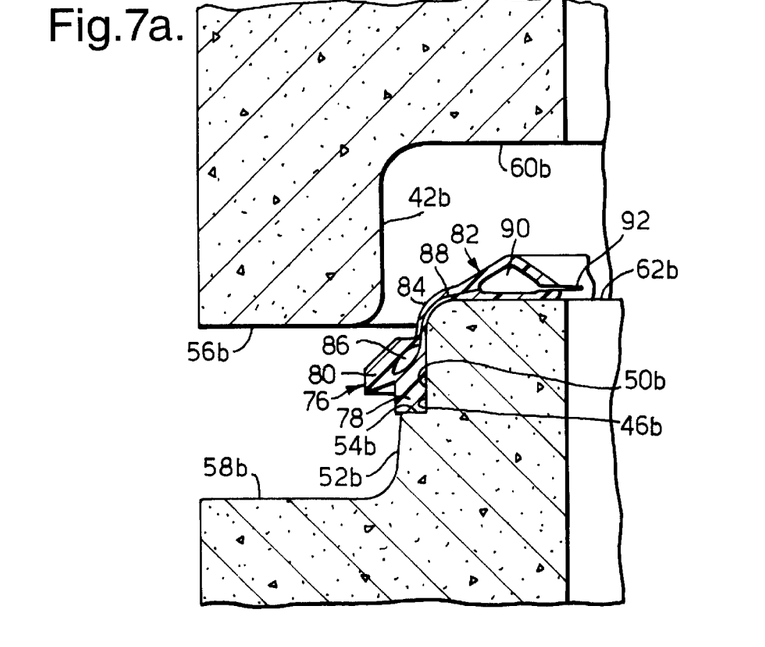
FIGS. 7a and 7b show sections corresponding to FIGS. 6a and 6b of a modified embodiment of the sealing device according to the invention.
Figure 7B:
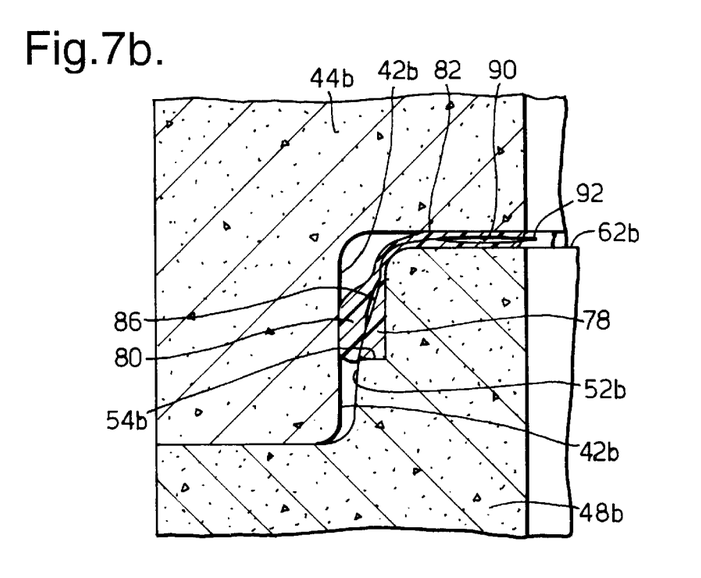

The embodiment of the sealing device according to the invention shown in FIGS. 7a and 7b is in substantial agreement with the embodiment according to FIGS. 6a and 6b, and the same reference numerals are used in FIGS. 7a and 7b as well as in FIGS. 6a and 6b. In the embodiment according to FIGS. 7a and 7b the activating device 82 is provided with a connection 92 by means of which it is possible afterwards to supply pressure medium to the cavity 86 in the sealing body 80 through the cavity 90 and the channel 88 in order afterwards to increase the sealing pressure, if desired.

Figure 8A:
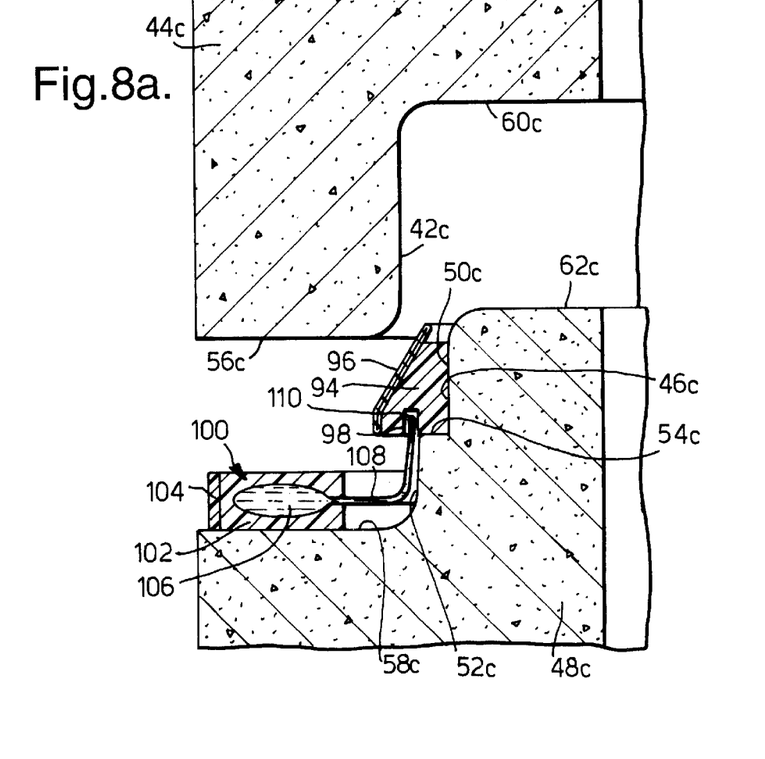
FIGS. 8a and 8b show sections of a further embodiment of a sealing device according to the invention in a pipe joint prior to the establishment of the pipe joint and subsequently to the establishment of the pipe joint with an activating device included in the sealing device being shown in an activated position, respectively.
Figure 8B:
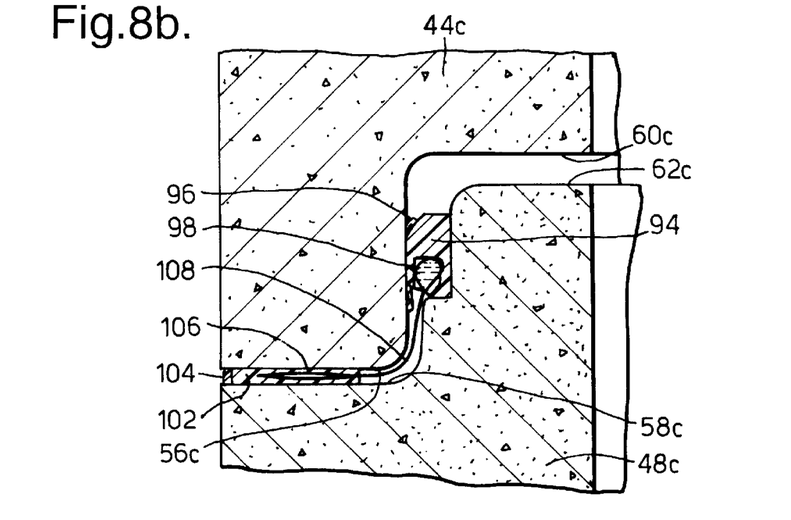

The embodiment of the sealing device according to the invention shown in FIGS. 8a and 8b is intended to be used at a socket and a spigot end of the same kind as the socket and the spigot end according to FIGS. 4a and 4b. In FIGS. 8a and 8b the socket and the spigot end as well as the different surfaces of the socket and the spigot end are designated with the same reference numerals as in FIGS. 4a and 4b with the addition of "c". The sealing device according to FIGS. 8a and 8b comprises a sealing ring 94 having a double sliding skin 96. The sealing ring 96 rests on the shoulder 42c of the spigot end and is provided with a cavity 98 at its lower surface. In addition to the sealing ring 94 the sealing device comprises an activating device 100 having an annular main portion 102 consisting of elastic material and a peripherally extending, enclosing portion 104 of harder material than the main portion 102. In the main portion 102 there is provided a cavity 106 which through a hose 108 is connected with an annular expansion body 110 positioned in the cavity 98 of the sealing ring 94. The cavity 106 is filled with a pressure medium which as in the embodiments described above can be constituted by a siliconepaste, any curable medium or a liquid, for example a mixture of glycol and water.

When the sealing surfaces 48c and 46c are connected with each other by lowering the socket 44c against the spigot end 48c there is provided a moderate compression of the sealing ring 94, the connection being facilitated by the fact that the sliding skin 96 which preferably contains a sliding medium engages the sealing surface 42c while an inner sliding takes place. When the surface 56c of the socket 44c contacts the activating device 100 the pressure medium is forced out from the cavity 106 and is supplied to the expansion body 110 through the hose 108, which provides that the sealing ring 94 is forced against the sealing surfaces in a direction transverse to the sealing surfaces 42c and 46c. Thus, also in this embodiment there is provided an automatic activation of the activating device 100 as a consequence of the connection of the socket and the spigot end with each other.

Figure 9A:
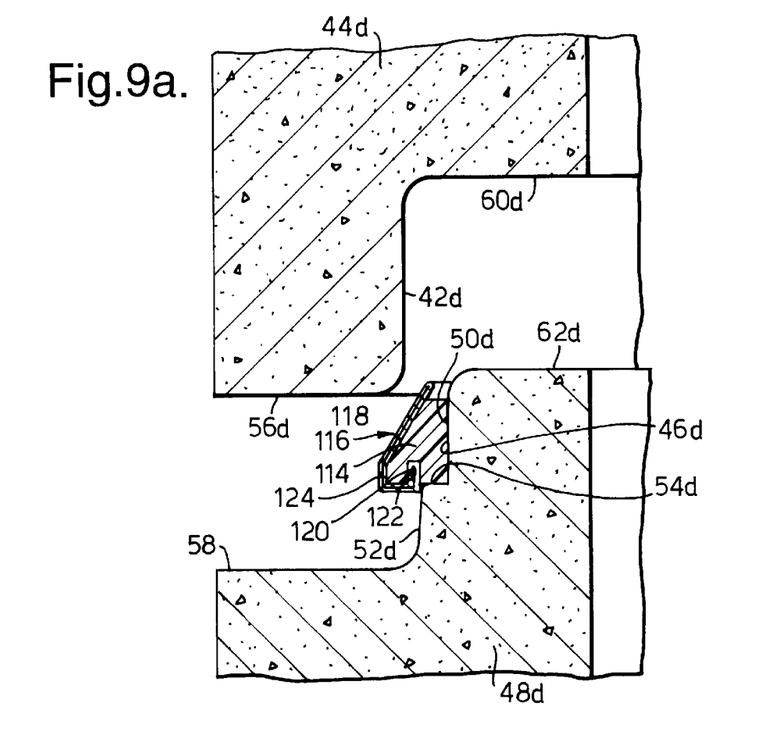
FIGS. 9a and 9b how sections of a further embodiment of a sealing device according to the invention in a pipe joint prior to the establishment of the pipe joint and subsequently to the establishment of the pipe joint and activation of an activating device included in the sealing device, respectively.
Figure 9B:
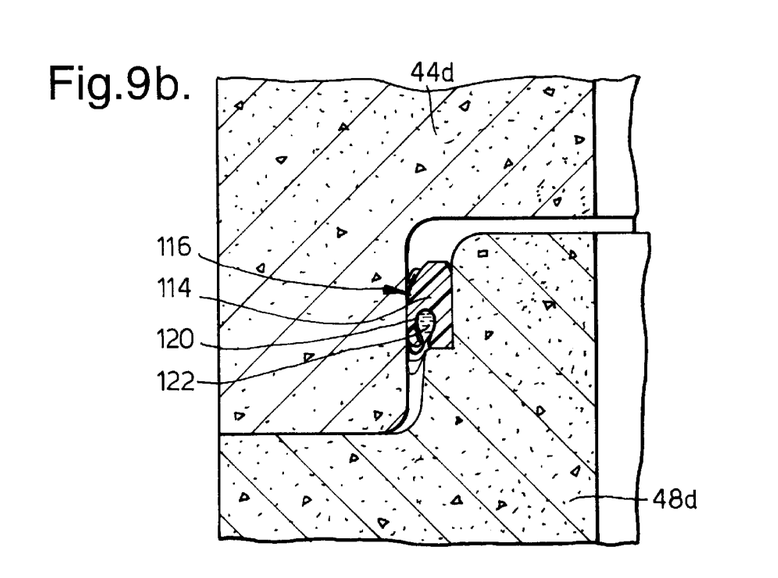

Also in the embodiment according to FIGS. 9a and 9b the sealing device according to the invention is intended for sealing a space between a socket and a spigot end of the same kind as according to FIGS. 4a and 4b and the following drawings figures. Also in FIGS. 9a and 9b the socket and the spigot end and the surfaces of the socket and the spigot end are designated with the same reference numerals as in the embodiment according to FIGS. 4a and 4b with the addition of "d". The sealing device according to FIGS. 9a and 9b comprises a sealing ring 114 having a sealing body 116 and a double sliding skin 118. The sealing ring 114 rests on the shoulder 54d and has a cavity 120 at its lower surface. The double sliding skin 118 extends into the cavity 120 and forms here a cavity 122. The sliding skin 118 forms a closed cavity 120 filled with a pressure medium, and when the sealing surfaces are connected with each other the pressure medium in the cavity 124 is forced into the cavity 122 of the cavity 120 of the sealing ring. Thereby, there is provided an increased pressing of the sealing body of the sealing ring against the sealing surfaces forming the space. Thus, in this embodiment the activating device is constituted by the sliding skin 118.

The invention can be modified within the scope of the following claims.

We claim:

1. A sealing device for sealing a space established by connecting two sealing surfaces, each surface positioned on one of two elements, into a position facing each other, said device comprising: a sealing body consisting of elastic material and adapted at the connection of the sealing surfaces to take a position in the space, in which said sealing body contacts the sealing surfaces; and an activating device for forcing said sealing body positioned in the space against the sealing surfaces when the activating device is activated, said activating device being automatically activated as a consequence of its engaging at least one surface of at least one of the elements on which the sealing surfaces are positioned during the connection of the sealing surfaces with each other.

2. A sealing device as claimed in claim 1, wherein said activating device comprises an expansion device which is adapted, at the activation of the activating device, to expand a cavity provided in said sealing body in a direction transversely of the sealing surfaces (42; 52) in order to force said sealing body against the sealing surfaces.

3. A sealing device as claimed in claim 2, wherein said expansion device comprises an expansion element having a wedge-shaped cross section, said expansion element being forcible into said cavity of said sealing body.

4. A sealing device as claimed in claim 3, wherein said expansion member having a wedge-shaped cross section is adapted, at the connection of the sealing surfaces with each other, to be forced into said sealing body by engagement with a surface on one of the elements extending transversely of the sealing surfaces, while said sealing body is supported by a surface on the other element extending transversely of the sealing surfaces.

5. A sealing device as claimed in claim 2, characterized in that said expansion device comprises a device for forcing a pressure medium into said cavity of said sealing body in order to expand said cavity in a direction transversely of the sealing surfaces and thereby forcing said sealing body against the sealing surfaces.

6. A sealing device as claimed in claim 5, characterized in that said device for forcing a pressure medium into said cavity of said sealing body comprises a member containing said pressure medium and having a channel containing said pressure medium and, at its end portion, is connected with said cavity of said sealing body.

7. A sealing device as claimed in claim 6, wherein said channel is connected with an element positioned in said cavity of said sealing body, said element expandable by the supply of said pressure medium thereto.

8. A sealing device as claimed in claim 6, wherein said device for forcing a pressure medium into said cavity of said sealing body is adapted to be activated by compression of said member containing said pressure medium between two surfaces extending transversely of the sealing surfaces.

9. A sealing device as claimed in claim 1, wherein said activating device comprises an expansion device which is adapted, at the activation of the activating device, to compress at least portions of said sealing body in a direction parallel with the sealing surfaces and thereby forcing said sealing body against the sealing surfaces.

10. A sealing device as claimed in claim 9, wherein said sealing body is positioned between said expansion device and a support surface extending transversely in relation to the sealing surfaces.

11. A sealing device as claimed in claim 9, wherein said expansion device comprises a pressure body which can be forced against said sealing body in a direction substantially parallel with the sealing surfaces.

12. A sealing device as claimed in claim 1, wherein the sealing surfaces are adapted to be connected with each other in a direction parallel with the sealing surfaces, said activating device adapted to be activated as a consequence of its engagement with said at least one element surface extending transversely of the sealing surfaces.

13. A sealing device as claimed in claim 12, wherein said activating device is adapted to be activated as a consequence of being compressed between two surfaces extending transversely of the sealing surfaces.

* * * * *